(12) United States Patent
Jeanseau et al.

(10) Patent No.: US 6,183,528 B1
(45) Date of Patent: Feb. 6, 2001

(54) CLEAN ROOM AIR FILTER SYSTEM WITH SELF-SUPPORTING FILTER UNITS

(76) Inventors: Peter Jeanseau; Richard Braman, both of 3071 E. Coronado St., Anaheim, CA (US) 92806

( * ) Notice: Under 35 U.S.C. 154(b), the term of this patent shall be extended for 0 days.

(21) Appl. No.: 09/249,948

(22) Filed: Feb. 12, 1999

Related U.S. Application Data (62) Division of application No. 08/850,714, filed on May 2, 1997, now Pat. No. 5,871,556.
(60) Provisional application No. 60/029,122, filed on Oct. 24, 1996, now abandoned, and provisional application No. 60/039,222, filed on Feb. 28, 1997, now abandoned.

(51) Int. Cl.$^7$ .................................................. B01D 46/00
(52) U.S. Cl. ............................ 55/385.2; 55/484; 55/502; 55/508; 454/187
(58) Field of Search .................................... 55/385.2, 483, 55/484, 497, 502, 508; 52/506.06, 506.08; 454/187

(56) References Cited

U.S. PATENT DOCUMENTS

| | | | |
|---|---|---|---|
| 2,714,750 | * | 8/1955 | Facciolo .............................. 52/506.06 |
| 3,350,862 | * | 11/1967 | Nutting ................................... 55/484 |
| 3,383,811 | * | 5/1968 | Ades .................................. 52/506.06 |
| 3,525,200 | * | 8/1970 | Smith ...................................... 55/484 |
| 3,570,385 | * | 3/1971 | Heisterkamp ........................ 454/187 |
| 3,782,082 | * | 1/1974 | Smith et al. .......................... 55/484 |
| 3,986,850 | * | 10/1976 | Wilcox ................................. 56/385.2 |
| 4,665,669 | * | 5/1987 | Neuser ............................. 52/506.08 |
| 5,329,739 | * | 7/1994 | Madl, Jr. ........................... 52/506.06 |
| 5,871,556 | * | 2/1999 | Jeanseau et al. .................... 55/385.2 |

* cited by examiner

*Primary Examiner*—C. Scott Bushey
(74) *Attorney, Agent, or Firm*—Louis J. Bachand (57) ABSTRACT

Clean room ceiling in which the individual filter units are suspended solely by unshared suspension assemblies so as to be self-supporting and readily installable and removable individually and free of grids and other multiple unit supporting expedients.

20 Claims, 7 Drawing Sheets

CLEAN ROOM AIR FILTER SYSTEM WITH SELF-SUPPORTING FILTER UNITS

REFERENCE TO RELATED APPLICATION

This application is a divisional of our application Ser. No. 08/850,714 filed May 2, 1997, now U.S. Pat. No. 5,871,556, and claims the benefit of U.S. Provisional Applications Ser. Nos. 60/029,122, filed Oct. 24, 1996, now abandoned and 60/039,222, filed Feb. 28, 1997, now abandoned.

FIELD OF THE INVENTION

This application relates to construction of clean rooms, and more particularly HEPA, ULPA and like high efficiency air filter systems for clean rooms. Clean rooms are enclosed spaces wherein the ambient air is repeatedly filtered to be substantially free of particulates, e.g., installations in which air is highly filtered to maintain an absence of particulates larger than 0.3 micron size, with HEPA filters, or larger than 0.12 micron size with ULPA filters. The term "HEPA" will be used herein to refer to either or both of HEPA and ULPA filters and other like high efficiency filters. Clean rooms are commonly used in the pharmaceutical, medical and electronic industries.

BACKGROUND OF THE INVENTION

Typically, an array of filter units is disposed above or to the side of a clean room. The term "clean room ceiling" herein refers to either an overhead array, or a to-the-side, sidewall array of filter units. In either case the room air is collected, recycled, and brought under pressure to the filter units. A volume of air to be filtered is typically pressurized on the upstream side of the filter unit to enable flow through the filter media. The term "plenum" herein refers to that space in which air is at a relatively higher pressure before flow through the filter media than on the outlet side of the filter. In a large filter installation the plenum is a large volume space above the clean room ceiling. In a small installation, such as a bench apparatus, the filter unit is typically combined in a housing with a fan, which serves to pressurize the air for through-filter media flow. The plenum-contained, pressurized air passes through the rear face of the filter units, through the filter media within the filter units and to the front face of the filter units for reintroduction into the clean room or toward the bench.

Because the filter units are of relatively limited size, a typical unit being only two feet by four feet, and the frequent need to cover a greatly extended area over a clean room, often the size of several football fields, multiple ones of the filter units are mounted adjacent one another in a laterally and longitudinally extended array, and the array sealed against leakage of unfiltered air from the plenum. The filter array mounting and sealing challenge has been met in the past by erecting extensive grids, suspended from above, onto which the filter units are placed. These grids often take the form of troughs with the individual filter units being fitted into a given rectangle of the grid with a projecting portion of the filter units being immersed in a gel sealant carried in the trough. The sealant and filter unit portions cooperate to block air flow from the plenum from entering the clean room except through the filter units. The grid troughs have a certain width, which increases the lateral spacing between filter units, ironically increasing the paths for sideflows of unfiltered air. In addition, the trough width reduces the proportion of filtered air area in the clean room ceiling, and induces turbulent air flow between the filter units, causing vibration.

Gel sealants to be effective must retain some elasticity or capacity to flow, despite years in place, so as to continually bear against the filter unit portions in the trough despite aging of the gel and vibration of the filter units. Replacement of the HEPA filter units as they become inefficient is a burdensome task. The individual units must be lifted up and away from the gelatinous mass in the troughs sufficiently to clear the trough edges, tipped or somehow angled so as to pass through the grid opening defined by the troughs, and carried out of the grid. Clinging gelatinous sealant can be messy. The installation of the new filter unit repeats these steps in reverse. More gel sealant may need to be added; these gels are quite expensive.

In U.S. Pat. No. 4,883,511 to Gustin et al, a clean room ceiling system is shown which uses gel sealants to seal filter units held in a vertically staggered array to support each other without use of a planar grid of troughs. In U.S. Pat. No. 5,329,739, the patentee Madl describes a clean room filter system in which clusters of four filter units are supported together at the intersection of their respective corners by a disk overlapping each corner, the disk depending from a support surface such as a ceiling. Gel sealant carried on sealing strips seals the filter units against unfiltered air leakage.

BRIEF SUMMARY OF THE INVENTION

The present invention provides a number of improvements in clean room technology. The invention clean room ceilings have a less costly, more convenient, simpler, and more effective design. Sealant gels are no longer necessary. Individual filter units are self-supporting, freely of shared support with other filters. The invention does away with the entire grid structure formerly though necessary both to support and to seal the clean room ceiling filter units against sideflows of unfiltered air. All the filters are in a plane and none need be vertically staggered as in the Gustin patent. No filter shares its support with an adjacent filter, much less three adjacent filters as in the Madl patent. In this invention the filter units themselves carry internally their means of own individual support, eliminating the extensive grids used heretofore, and obviating the need for arbitrary spacing between adjacent filter units now left to accommodate the filter support grid. The filter units being individually self-supporting are added into or removed from a ceiling array without disturbing the laterally or longitudinally adjacent filter units. The filter units are readily shiftable into or out of position. Adjacent filter units are closer together than in conventional clean room ceilings, increasing the proportion of the ceiling that is composed of filter units, reducing air flow incursions between the filter units, its turbulence and concomitant vibration. The invention filter units and filter unit suspension assemblies cooperate to permit ready locking in place by simply shifting the filler unit into position against the installed suspension assembly and snap-flocking the filter to the support, from below, and without extensive screwing of threaded elements together. Conversely, the filter unit suspension assembly is simply disconnected, and from below the filter unit, for easy removal with a disassembly feature to be described. The filter units are sealed to each other across their narrow separation. Sideflows of air along the filter units walls are blocked by an adherent, suitably self-supporting mass or web bridging the gap between adjacent filters and lying across any possible flow path, an expedient made feasible by the close spacing of the filter units. The new filter support system is easily integrated with sprinkler systems and ceiling lamps. Blank units (rectangular panels without filters) can be substituted for filter units as need without changing the simplicity, which is the hallmark of the invention. Other features and advantages of the invention will become known from the following description.

The invention accordingly provides a clean room ceiling having multiple filter units each comprising a unit frame and, therewithin, filter media, the units being suspended in place by unshared suspension components including individual ties, to be suspended freely of other support such as a grid or other filter units, and a tie anchoring bracket within each filter unit inward of the unit frame periphery, adjacent ones of the unit frames being sealed against air leakage between units.

The invention further provides a clean room filter comprising segmented filter media within a filter frame, and a bracket forming an anchor between media segments, the bracket anchor being attached to the frame and adapted to secure a tie to the filter in supporting relation, whereby the filters are self-supporting in an array of the filters.

More particularly, the invention provides a clean room filter array comprising a plurality of individual filter units arranged for delivery of filtered air to a clean room, each of the individual filter units having a suspension assembly unshared with any other filter unit, whereby each filter unit is shiftable to and from the array independently of shifting the position or orientation of the other filter units or altering their respective suspension assemblies.

In this and like embodiments, generally, there is also included air flow blocking structure between adjacent filter units, typically the air flow blocking structure comprising a filter unit-supported air impervious mass such as caulking, a web such as a tape, or other structure which is desirably self-supporting and can be adhered in place arranged to block air flow between adjacent filter units. The air impervious web preferably comprises a self-supporting filter unit-adherent web, e.g., solidified caulk compound, or a tape which can be formed in situ by painting or otherwise, extending between adjacent filter units to block air flow therebetween. Further, the filter units each have a face portion facing the clean room, the mass, web or tape being adhered to or adjacent the unit face in bridging relation between adjacent filter units to block air flow therebetween.

In a further embodiment, the invention provides a clean room filter array comprising a laterally and longitudinally extended plurality of individual filter units arranged for delivery of air from a plenum to a clean room through the face of each the filter, each individual filter unit heaving a laterally adjacent filter unit across a gap therebetween through which unfiltered air flows past the filter units, and an air impervious mass secured across at, adjacent or in the gap to bridge the gap in air flow blocking relation. The mass suitably comprises web such as a tape comprising a backing and an adhesive layer, the mass being, e.g., a tape sufficiently flexible to air tightly seal to itself in crossing relation, or the mass comprises a formable sealant adherent to itself and the adjacent filter units in gap sealing In a further embodiment of the invention there is provided in combination: an individual filter unit adapted for arrangement in an array for delivery of filtered air to a clean room, and an individual filter unit suspension assembly unshared with any other filter unit of the array.

In this and like embodiments typically: the filter unit comprises a filter frame, and filter media within the frame; the suspension assembly comprises a bracket mounted to the frame and adapted for mounting the filter unit to a support surface outside the frame; the suspension assembly further comprises an elongated member adapted to connect the filter unit bracket to a supporting surface in spaced relation of the filter unit frame to the supporting surface; the filter unit frame defines a front face facing the clean room and an oppositely facing rear face, the suspension assembly comprising an elongated member extending from the support surface, a bracket connected to the filter unit frame and preferably located within the plane of the filter frame, and cooperating structure on the elongated member and the bracket respectively, the cooperating structure securing the bracket to the elongated member, whereby the elongated member extends through the filter unit frame rear face toward but not necessarily to the filter unit frame front face; the suspension assembly elongated member extends a predetermined distance which is suitably greater than the distance between the supporting surface and the filter unit frame rear face and not substantially greater than the distance between the supporting surface and the filter unit frame front face, whereby the elongated member terminates beyond frame rear face and adjacent the frame front face, the suspension assembly bracket being mounted to the filter unit frame in a manner to interest with the elongated member at the cooperating structure and preferably within the perimeter of the filter unit frame in sonic embodiments of the invention; the filter unit further comprises a filter media divider between separate sections of filter media, the suspension assembly bracket preferably being located at the divider; the divider extends between the filter frame rear face and the filter frame front face, having a shoulder portion, the divider shoulder portion-defined suspension assembly bracket defines a member mount, the suspension assembly elongated member being mounted to the suspension assembly bracket at the member mount in individual filter unit supporting relation; there is further included a fastener fastenable to the elongated member, the fastener blocking separation of the elongated member and the suspension assembly bracket in individual filter unit supporting relation; the divider is interiorly open between the frame front face and the location of the fastener on the elongated member, the fastener being sized to be movable through the open interior of the divider; the divider has a front face wall, and a sidewall therebetween defining a divider open interior, the divider open interior extending between its the front and rear face walls, the elongated member extending into the open space through the divider rear face wall, a fastener fastenable to the elongated member in blocking relation to the member inward of the divider rear face wall, the fastener being insertable or removable from the member and the divider through the divider front face wall.

In a further embodiment, the invention provides, in combination: an individual filter unit adapted for arrangement in an array for delivery of filtered air to a clean room, and an individual filter unit suspension assembly unshared with any other filter unit of the array, said individual filter unit having left and right packs of filter media and a rigid divider therebetween, the divider defining a suspension assembly bracket, a suspension assembly elongated member mounted to said suspension assembly bracket, and a fastener fastenable to the elongated member to block separation of the elongated member and the suspension assembly bracket in individual filter unit supporting relation.

In this and like embodiments, typically, the fastener comprises a lock body, a movable latch finger mounted in the lock body, the movable latch finger being shiftable from the lock body, and biasing structure biasing the movable latch finger to shift from the lock body, the lock body being sized to pass the assembly bracket in the unshifted condition of the latch but not in the shifted condition of the latch, like a snap lock; the divider has a rear face wall, an open interior, and a front face wall, the divider front face wall being arranged to pass the fastener lock body out from the divider open interior and to give access to the fastener for fastening or unfastening the fastener through the divider front face wall; and the fastener latch finger is shifted outward against the bracket in response to the fastener lock body passing the divider rear face wall from within the divider open interior.

In a further aspect of the invention, there is provided in combination: an individual filter unit adapted for arrangement in an array for delivery of filtered air to a clean room, and an individual filter unit suspension assembly unshared with any other filter unit of the array, each filter unit having a filter frame comprising a wall, the filter frame wall defining a suspension assembly bracket, the suspension assembly further comprises an elongated member extending from a support surface to the bracket in engaging relation.

In this and like embodiments, the suspension assembly bracket further comprises a fastener, e.g., a separable fastener, supported by the filter unit frame wall, the fastener being engaged with the bracket in elongated member retaining relation, whereby the filter unit frame is supported; the suspension assembly bracket comprises a flange projecting from the filter unit frame wall in elongated member engaging relation in cooperation with the fastener; and there is further included a sealing strip circumscribing the filter frame in adjacent filter frame engaging relation, the bracket flange overlying the sealing strip.

In certain embodiments, the filter unit frame has a front face facing the clean room, and includes also a resilient strip extending about the filter unit frame rearwardly adjacent the filter unit frame front face to leave an exposed edge margin of the filter unit frame; and in these other embodiments there is further included in combination with an adjacent filter unit an air impervious mass, such as a web, blocking air flow between adjacent filter units, the mass being attached adjacent the front face and the exposed edge margin of the filter unit frame.

The invention further provides a filter unit for installation in a clean room array oil filter units, the filter unit comprising a filter frame, filter media within the frame, and a suspension assembly bracket defining, e.g., inward of the periphery of the filter unit frame and/or within the plane of the filter media, a locus of attachment for an elongated member extending from a supporting surface.

In this and like embodiments, typically, the filter unit has a filter media divider attached to the filter unit frame, the divider having a pair of spaced apertures adapted to cooperate with a pair of elongated members in bracket defining relation; the filter media divider further includes an additional aperture adapted to pass water-carrying conduit through the filter unit frame divider; the filter unit is combined with water-carrying conduit and a sprinkler head; the filter unit frame includes a frame wall surrounding the filter media, the frame wall defining a bracket adapted to cooperate with the elongated member in filter unit supporting relation, and the filter unit is combined with a fastener engaged with the bracket, e.g., with a fastener wholly within the recess defined by the filter unit wall.

In a further embodiment, the invention contemplates a clean room filter system in which the individual filter units are each supported by their own suspension assemblies free of any suspension support, such as a grid or disk, or other structure which is adapted or arranged to engage simultaneously in supporting relation two or more individual filter units In this and like embodiments, typically, the individual filter units have a frame and filter media from other portions thereof, and there is further included a sprinkler system having a plurality of downcomers equipped with sprinkler heads, the sprinkler system downcomers passing through the individual filter units through the dividers therein; the individual filter units are shiftable to and from the system from within the clean room and without need of changing the suspension arrangement of the adjacent filter units, in contrast to the Madl and Gustin systems discussed above.

In another aspect, the invention provides a clean room comprising an enclosed volume at least partly defined by a clean room filter array comprising a plurality of individual filter units and in spaced relation to a support surface, the clean room enclosed volume having air recirculation to and from the enclosed volume, filter units of the filter array being disposed opposite the support surface and arranged to filter the recirculating air, the filter array filter units being supported by individual suspension assemblies peculiar to each filter unit, the filter units being sealed to each other against unwanted air flow therebetween.

In a highly particular embodiment, the invention provides a clean room filter array comprising a series of laterally and longitudinally juxtaposed individual and mutually independent filter units arranged to filter air entering the clean room, each filter unit comprising a generally rectangular frame and left and right masses of filter media held within the frame, a media divider between the media masses, the media divider having a longitudinal wall opposite each of the media masses and upper and lower transverse walls between the longitudinal walls arranged such that the divider is interiorly open; individual and mutually independent suspensions for each of said filter units, each suspension comprising a rod extending from a support surface, a bracket defined by a portion of the divider upper transverse wall, the bracket comprising a wall portion surrounding an aperture in the upper transverse wall, and a fastener coupling the rod and bracket together, the fastener comprising a nut threadedly mounted on the rod, the nut having a spring loaded latch finger which extends over the bracket wall portion about the aperture when the rod extends through the aperture carrying the nut, whereby the filter unit frame is mountable to the rod by shifting the filter unit to and over the end of the rod and along the rod until the nut is encountered, compressing its extending latch finger into said nut with the bracket until the aperture is passed whereupon the latch finger reextends from the nut and engages the bracket against return shifting of the filter frame until the latch finger is again compressed into the nut and the nut withdrawn through the aperture, the rod carrying a guide plate spaced from said bracket a distance sufficient to permit said nut to fully pass through said aperture from within said divider while maintaining the filter at a common level with other filters.

BRIEF DESCRIPTION OF THE DRAWINGS

The invention will be further described as to an illustrative embodiment in conjunction with the accompanying drawings in which the several Figures illustrate the invention.

DETAILED DESCRIPTION

As noted above, the invention provides an improved clean room ceiling, one in which the formerly used combined filter support and sealing grid is obviated in favor of the simple individual mounting of each filter unit by its own suspension assembly. Sealing is effected by a web of caulk material or tape, applied per se or formed in situ, or, if preferred, by other sealing techniques such as conventional gels without, however, the use of filter unit supporting grid troughs. The mounting and demounting of the individual filter units involves merely the insertion of a support rod into a preformed aperture in the filter unit divider, or the filter unit wall, either of which defines the suspension bracket, and fastening the unit in place. Or unfastening.

Figure 1:
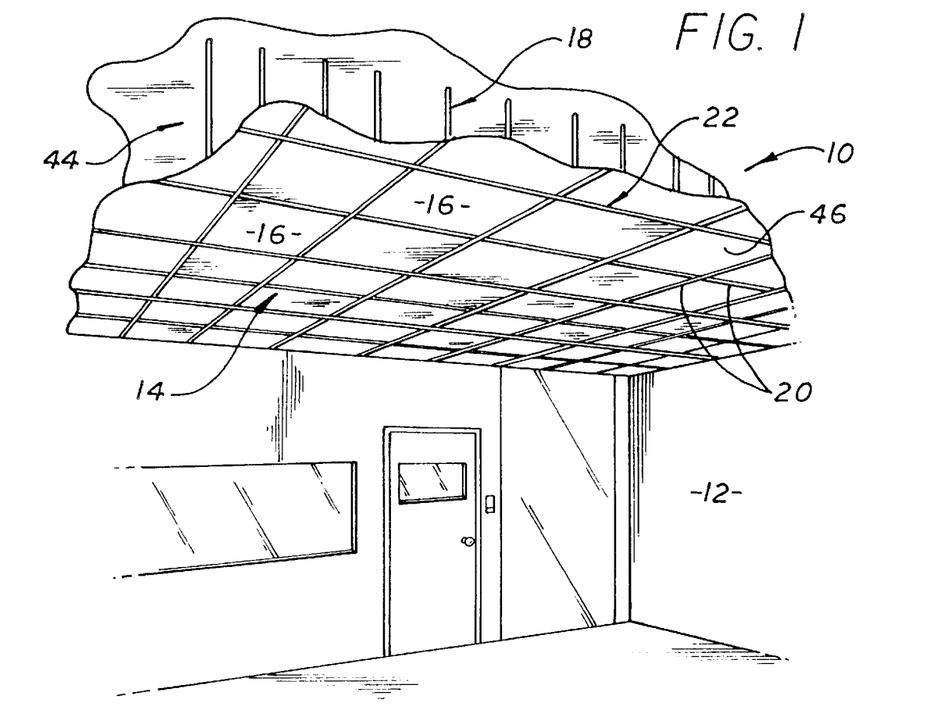
FIG. 1 is a perspective, fragmentary view of a clean room ceiling filter unit array as viewed from below.
Figure 2:
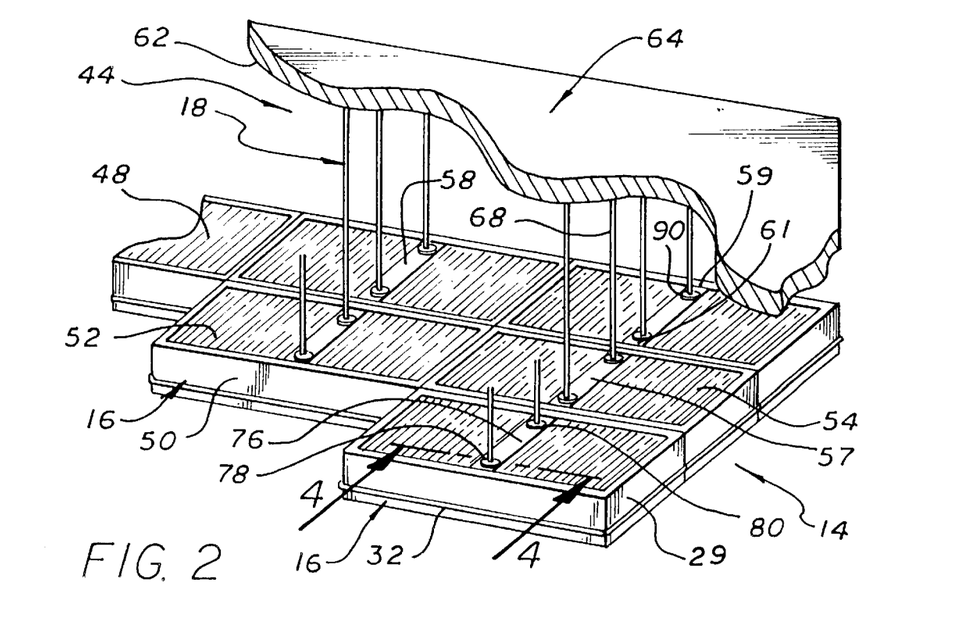
FIG. 2 is a fragmentary view of the filter array of FIG. 1, as viewed from above.
Figure 6:
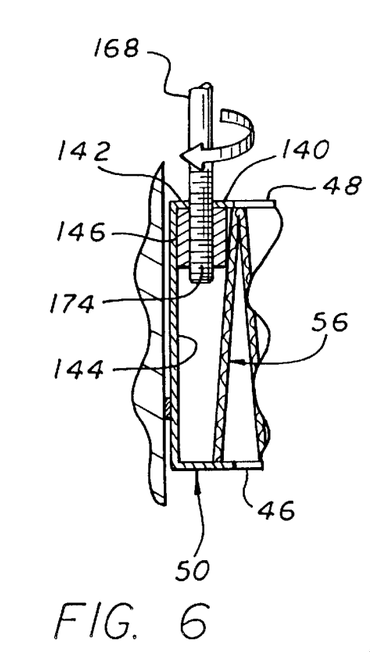
FIG. 6 is a fragmentary view in section of a further alternative support embodiment.
Figure 7:
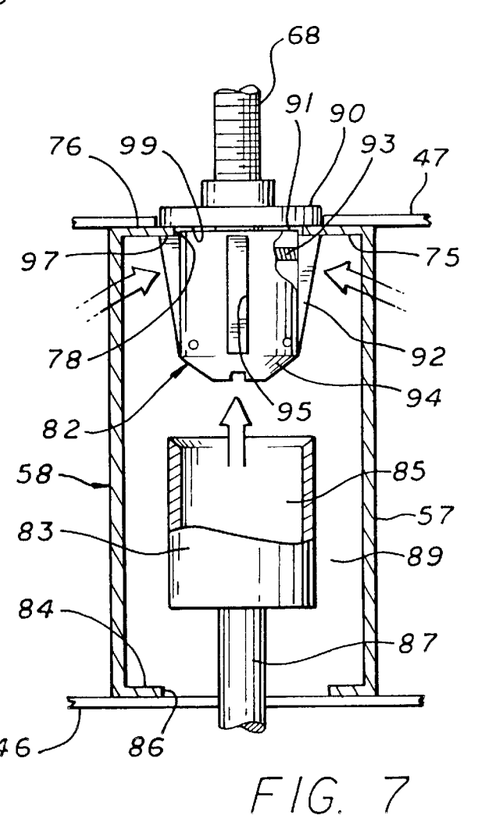
FIG. 7 is a fragmentary view like FIG. 4, but showing the fastener remover poised to deflect the latch members on the fastener.
Figure 8:
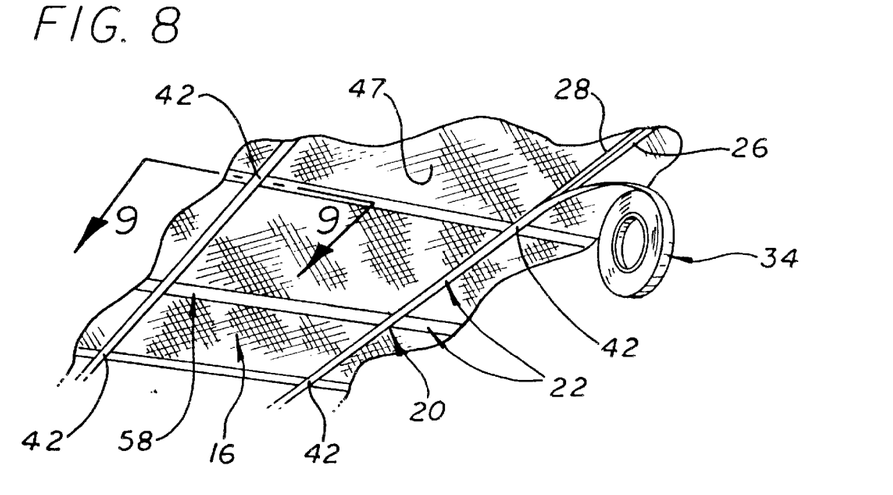
FIG. 8 is a fragmentary view of the filter unit array sealed with tape and forming a clean room ceiling.

With reference now to the drawings in detail, in FIGS. 1–10, and particularly FIGS. 1, 2 and 8, the invention clean room is shown at 10 comprising an enclosed volume 12, and thereabove a clean room filter array 14 comprising a plurality of individual filter units 16 arranged for delivery of filtered air to the clean room enclosed volume. Each of the individual filter units 16 has its own suspension assembly 18 unshared with any other filter unit. Accordingly, each filter unit 16 is shiftable to and from the array 14 independently of shifting the position or orientation of the other filter units, and freely of, or without, altering their respective suspension assemblies 18.

It will be noted the individual filter units 16 are very nearly laterally and longitudinally abutting, thus providing little space between adjacent units, especially in comparison with prior art systems in which the filters are collectively supported by a grid structure, or other arrangement, such as corner fittings, where the mass of the filter support system actually increases the space between filters, increasing the gap to be sealed and likely allowing undue air-flow related vibration. In the present invention the separation between adjacent filter units 16 is minimally that amount needed for mechanical clearance, thus increasing the filtered area in the clean room ceiling relative to its unfiltered area over other systems.

Figure 9:
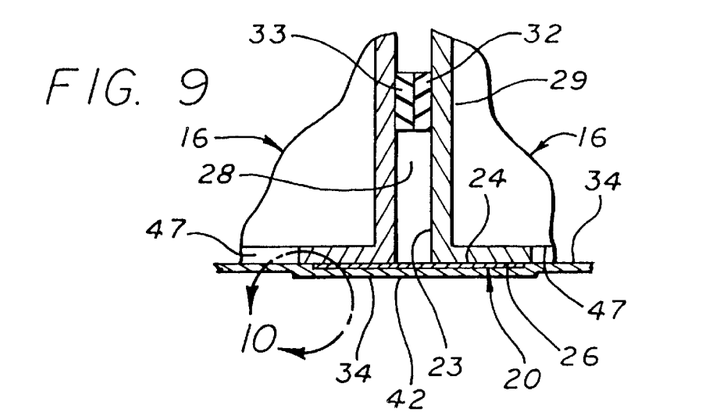
FIG. 9 is a view taken on line 9—9 in FIG. 8.
Figure 10:
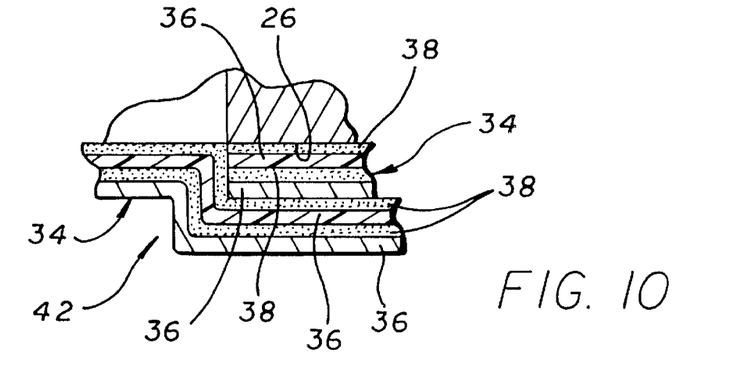
FIG. 10 is a view taken on line 10 in FIG. 9.

It is generally necessary to block air flow between adjacent filters, however, in the present design if the filters are left individually suspended and not permanently fixed together. Thus, the present invention clean room filter array 14 has air flow blocking structure 20 between adjacent filter units 16. In the FIGS. 8, 9 and 10 illustrated embodiment, the air flow blocking structure 20 comprises a filter unit 16-supported series of air impervious webs 22 is arranged to block air flow between adjacent filter units. The webs 22 are adhered to each of a pair of adjacent filter units 16, as shown, with the web edge margins 24 affixed to the front face edges 26 of the filter units so that the web bridges the gap 28 between the filter units. The gap 28 is typically small, e.g., less than twice the width of the filter unit wall 29, allowing for close spacing of the filter units 16, and the mentioned increase in proportion of filtered area in an installation, particularly over gel-dependent, grid-trough sealing systems. Each filter unit 16 suitably has a strip 32 of rubber, plastic or other, preferably elastomeric or resilient, material 33 thereon set back along the depth of the filter unit away from the filter unit front face edges 26, to provide space for adhesion of the web 22 to the edges and/or the adjacent edge margins 24. The resilient strip 32 serves as a form of partial air seal between adjacent units 16 and as well as a means of damping vibration in the array 14, such vibration being already reduced by the immediate adjacency of the juxtaposed filter units and consequent reduced air flow turbulence between the units.

In the FIGS. 8–10 illustrated embodiment, the air flow blocking structure 20 comprises air impervious web 22 in the form of a filter unit-adherent tape 34 extending between adjacent filter units 16 to block air flow therebetween.

Figure 11:
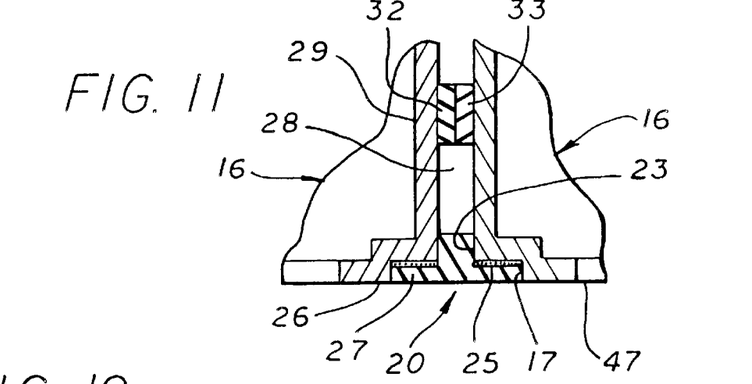
FIG. 11 is a fragmentary view in section of juxtaposed filters spaced and sealed.

In the FIG. 11 embodiment, the web 22 is in the form of an adhesive 25 held in place by a fitting 27 inserted into recess 17 between adjacent filter units 16. In the FIG. 17 embodiment, the web 22 is in the form of a rolled or otherwise formed caulking 31 which is inserted between the opposing filter units 16 so as to block air flow from the gap 28 into the clean room volume 12 (FIG. 1).

Returning to FIGS. 8–10, the tape 34 may be preformed or formed in place by painting, rolling or otherwise applying a suitably viscous paste or liquid which is film-forming upon evaporation of solvent, or by other means. Preferably, the tape 34 is a preformed structure typically comprised of one or more layers of a strong backing 36 itself made of any suitable metal, cellulosic, or plastic material, for example, and for each backing layer a strongly adhering layer 38 of adhesive material, such as isobutylene and silicone-based adhesives. Multiple layers of these and other adhering or strengthening materials can be used. In preferred embodiments, the tape 34 runs laterally of and longitudinally of the clean room filter array 14 matching the rectilinear openings of the gaps 28. Thus deployed, tape 34 has intersections 42 at intervals corresponding to the corners of filter units 16. It is important to maintain the integrity of the seal at these intersections 42. This can be done by selecting a tape 34 which is flexible enough in the backing and/or the adhesive layers 36, 38 respectively to closely fit into the inevitable folds and angles of the tape as it meets at edges or passes over itself at intersections 42. In particular, the angle of the tape 34 in rising from the filter unit 16 to cross a second segment of the tape may not be a perfect 90 degrees if the tape backing 36 material is not sufficiently flexible to bend and stay bent at 90 degrees. In this circumstance the adhesive layer 38 volume is desirably thick or great enough to bridge the typically triangular volume between differently directed crossing segments of tape 34; or other expedients can be used to obtain and maintain the desired contact and air flow imperviousness of the tape 34 at all points including tape intersections 42, such as added layers or pieces of material, compression devices, caulking, and other bonding agents, not shown.

Having detailed the sealing between filter unit 16 we will turn particularly to FIGS. 1, 2, 3 and 4. The clean room filter array 14 of a laterally and longitudinally extended plurality of individual filter units 16 is arranged for delivery of air from plenum 44 to the clean room volume 12 to the filter unit front face 46 from the filter unit rear face 48 of each filter unit 16, the individual filter units each being in combination with an individual filter unit suspension assembly 18 unshared with any other filter unit of the array.

Figure 3:
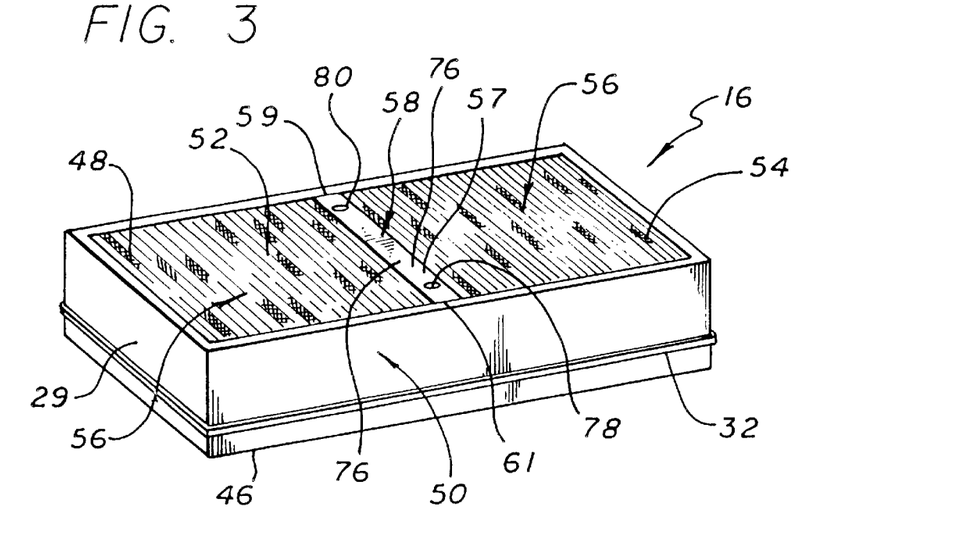
FIG. 3 is an axonometric view of a single filter unit before assembly with the support rods.

Each filter unit 16 comprises a filter frame 50 having walls 29 suitably of aluminum or other metal but possibly of wood. Within the frame 50 and between its rear face 48 and its front face 46 are disposed left and right hand packs 52, 54 of filter media 56, the filter media lying within the filter frame walls 29. A divider 57 separates the left and right filter packs 52,54. In the past, the function of the divider 57 has been to support the filter packs 52, 54 in place and to give rigidity to the filter unit frame 50. These functions continue in the invention filter units 16, and a new function, that of a bracket to support the individual filter units from individual suspension assemblies 18, is added. Divider 57 is a box-beam configured, rigid element which is bonded to the filter frame 50 at its opposite ends 59, 61 and defines the suspension bracket 58 as will be described hereinafter.

Each suspension assembly 18, then, comprises the bracket 58 mounted within the filter frame 50, the bracket being adapted for mounting its individual filter unit 16 to the support surface 62 outside or beyond the frame and typically to the structural or true ceiling of the room in which the clean room is constructed. While the clearance between the clean room filter array 14 and the true ceiling of the surrounding room is often great, with the present invention, lower height rooms than are normally contemplated for clean room installation will be useful. Omitting the construction of the extensive trough grid and support system as allowed the present invention permits installations in places hitherto thought to be too low ceilinged for the old type of installation, or too small to permit incurring the typical grid system expense.

The filter unit array 14 is surmounted by the true room ceiling, or by a ceiling substitute such as constructed housing 64, providing support surface 62 (FIG. 2) and which with the filter unit array 14 forms the plenum 44. The filter media packs 52, 54 are open to enclosed volume 12 at the front face 46 of the filter units 16 and the plenum 44 at the rear face 48 of the filter units.

The suspension assembly 18 further comprises a rod 68 or other elongated member adapted in its length, diameter, strength and conformation to connect the filter unit suspension bracket 58 to the support surface 62 at the room ceiling or elsewhere, in spaced relation of the filter unit frame 50 to the supporting surface. The suspension assembly elongated rod member 68 extends from the support surface 62 to the bracket 58 connected to the filter unit frame 50 and preferably located within the plane of said filter media packs 52, 54, or within or adjacent the plane of the filter unit frame. The rod 68 is usefully threaded at 74 or carries other cooperating structure with the bracket 58 for securing the bracket to the rod. Typically in the embodiment of these Figures, the rod 68 extends through the filter unit frame rear face 48 and not to the filter unit frame front face 46, so as to terminate within the filter unit frame 50 and generally within the plane of the filter media packs 52, 54.

The suspension assembly bracket 58, as mounted in the filter unit frame 50, intersects with the elongated rod member 68 at or near its cooperating thread structure 74 and within the perimeter of said filter unit frame. Forming the bracket 58, the divider 57 extends transversely of the filter unit frame 50 and has a shoulder portion 75, generally corresponding to a portion of the divider top wall 76. The divider shoulder portion 75 is locally apertured to have in this embodiment of the invention front and rear mounting holes 78, 80 into which the rods 68 are interfittable so as to support the individual filter unit 16 by addition of a fastener 82 to the threaded portion 74 of the rod 68. The fasteners 82 block separation of the rods 68 from holes 78, 80 as shown. The divider 57 is interiorly open between the filter unit face 46 and location of said fastener 82 on rods 68, the fastener being sized to be movable through the open interior of the divider.

Access to the fasteners 82 may advantageously be from the front face 46 of the filter unit 16. For this purpose, front wall 84 of the divider 57 preferably has additional holes, e.g., hole 86, in registration with holes 78, 80 and sized to pass the fasteners 82 up to the threaded portion 74 of rod 68.

With particular reference to FIG. 7, a tool 83 comprising a socket 85 mounted on a shank 87 is sized to pass through hole 86 for carrying a fastener 82 toward or from the rod 68 so as to have the fastener traverse the open interior 89 of the divider 57 in a controlled manner while not requiring the leaving open any great portion of the face 46 of the filter unit 16. The fastener 82 is thus readily accessible through hole 86 for purposes of insertion and tightening or untightening and removal of the fastener. It will be noted that the tool socket 85 will overfit fastener 82 and collapse its latch fingers 92 for purposes now to be explained.

Figure 4:
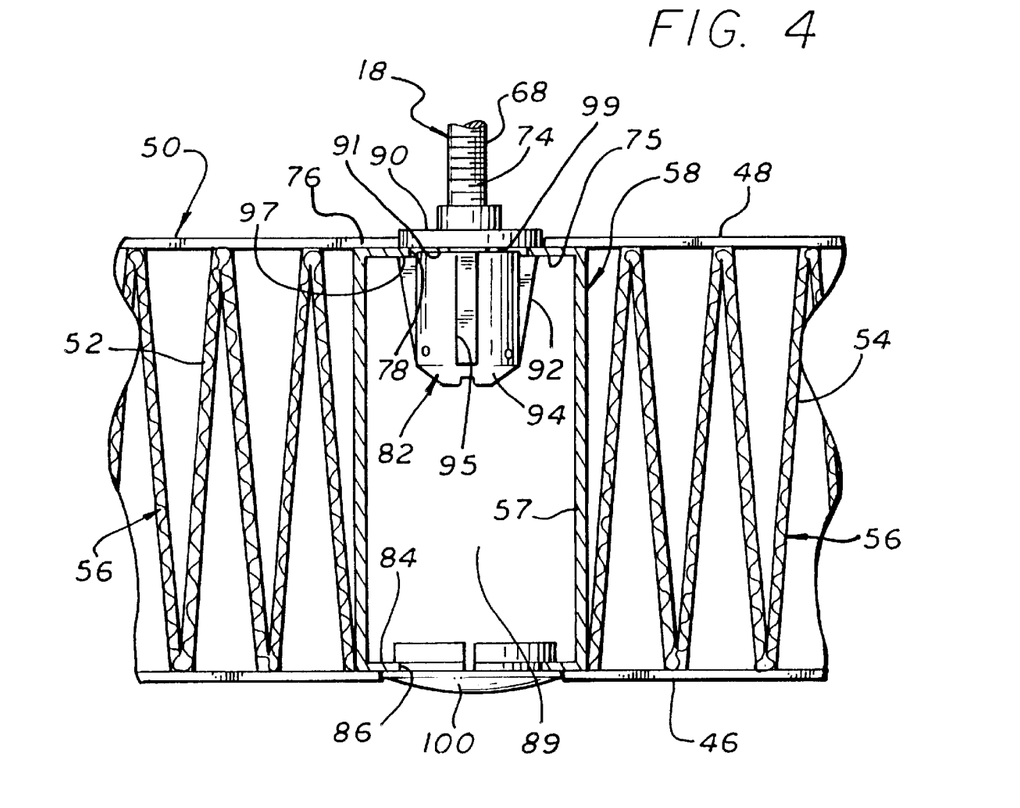
FIG. 4 is a view taken on line 4—4 in FIG. 2.

With reference particularly to FIGS. 1, 4 and 7, in a typical clean room filter array installation using the invention filter units 16 and suspensions 18, a plurality of rods 68 are suspended from the support surface 62. The rods 68 carry leveling plates 90 at a predetermined, measured height within the room enclosed volume 12. Plates 90 will be level one with another and are used to line up the filter units 16 at the same height.

Figure 5:
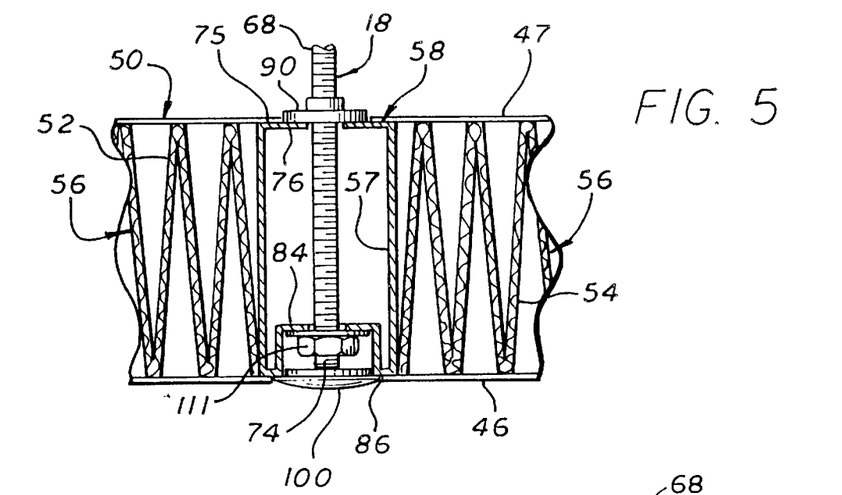
FIG. 5 is a fragmentary view in section of the filter unit in an alternative support embodiment.

Suspension fasteners 82 are designed for quick installation of the filter array 14. Each fastener 82 comprises a fastener body 94 having, e.g. four, circumferentially distributed, vertically disposed body slots 95 in each of which a shiftable latch finger 92 is carried in pivoting relation for movement in and out of the body slots. Compression springs 93 (FIG. 7) seated within slots 95 resiliently urge the fingers 92 outward to a locking position as shown in FIGS. 5 and 7 unless retracted by the tool 83, for example. Shifted outward, the latch fingers 92 bear against the divider shoulder portion 75. The fastener 82 is threaded onto the suspension member rod 68 threaded portion 74 to a predetermined position, as shown. This position provides a gap 91 equal to approximately the thickness of the divider top wall 76 between the upward edges 97 of the spring loaded fingers 92 and the downward face 99 of the plates 90. In the installed condition of a filter unit 16, the divider top wall 76 is disposed in the gap 91 between the latch fingers 92 and the plate 90. The filter unit divider mounting holes 78, 80 also function to close up the spring loaded fingers 92. Divider mounting holes 78, 80 are each sized to pass over the fastener 82 when the fingers are retracted, or shifted inwardly, and are desirably sized to effect the inward shifting themselves. Easy installation of the individual filter units 16 is thus provided as will now be described.

To install filter units 16, the suspensions 18 are arranged as just described with the rods 68 depending from a support surface 62, and in a pattern to register with the filter units. Plates 90 are at a predetermined, uniform level. See FIG. 2. A fastener 82 is threaded onto the threaded portions 74 of each rod 68 to a level to establish the desired gap 91. At each pair of suspension rods 68 a filter unit 16 is presented, oriented to have the front face 46 facing downward (assuming a ceiling supported installation) and the rear face 48 facing upward. The filter unit divider mounting holes 78, 80 are registered with the depending fasteners 82 and thus rods 68. The filter unit 16 is pushed upward such that the fasteners 82 pass through the divider mounting holes 78, 80. In this operation the holes 78, 80 close the fingers 92 against springs 93 until the fastener 82 latch fingers pass the holes and enter the divider interior 89. The spring loaded fingers 92 then shift outward, and as thus deployed engage the divider shoulder portion 75 as the filter unit 16 is allowed to rest upon the fastener fingers. The plate 90 limits the upward movement of the filter unit 16 in coordination with the fastener 82 passage through mounting hole 78, 80. The extended fastener fingers 92 support the filter unit 16 suspended in place. The access hole 86 is then suitably closed with a plug 100 which is readily removable in case it is desired to demount the filter unit 16. For demounting, the plug 100 is removed, the tool 83 is inserted through hole 86 to enclose the fastener 82 and close the fingers 92 into their fastener body slots 95. The fastener 82 will then pass back through hole 78 allowing the filter unit 16 to drop by force of gravity. It will be noted that adjacent filter units are not disturbed in their position or at their mountings by the addition or removal of one or several filter units in the just-described manner.

Figure 13:
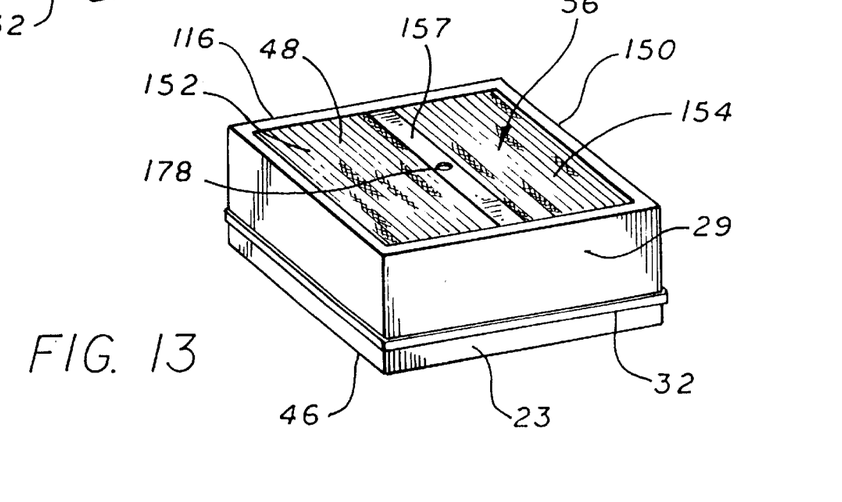
FIG. 13 is a view like FIG. 3, but of a single mounting point filter unit.
Figure 14:
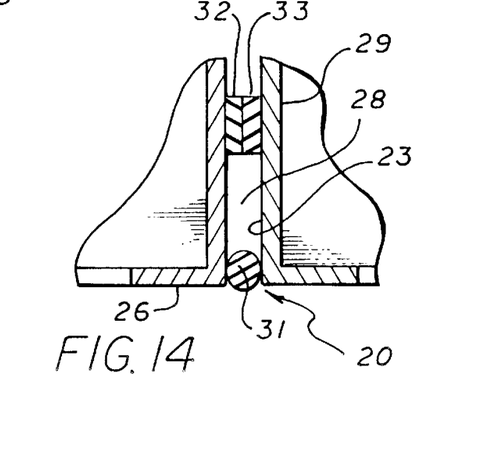
FIG. 14 is a view like FIG. 11 showing an alternative sealing arrangement.

The filter units can have a single mounting point rather than two. In FIG. 13, filter unit 116 comprises a frame 150, filter packs 152, 154 and has a divider 157. Divider 157 has a single mounting hole 178. Mounting of the filter unit 116 is as with filter unit 16 using the same suspension assembly as previously described, except that there is a single rod mounting locus at hole 178 and it is centered on the filter unit divider 157.

Figure 12:
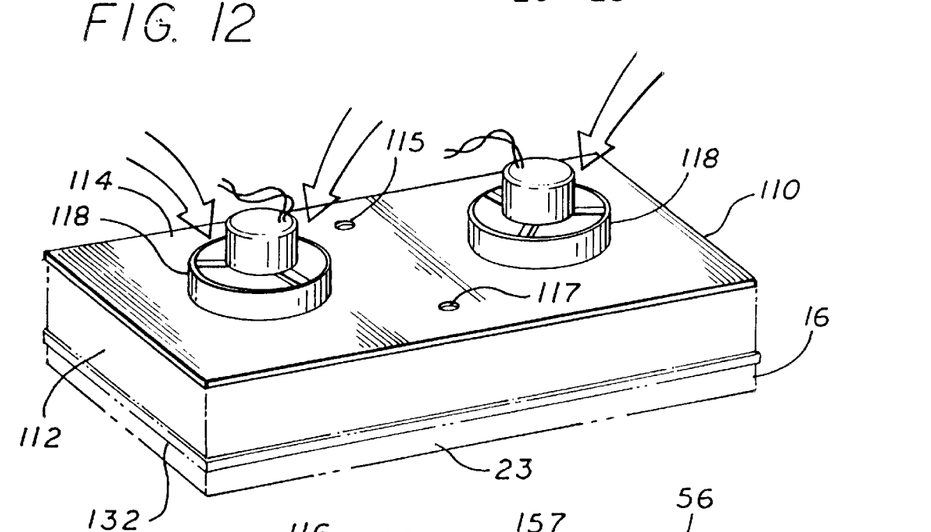
FIG. 12 is a view of a filter and plenum combination embodiment of the invention.

Other filter unit arrangements within contemplation of the invention include self-contained units in which the filter frame and filter packs are incorporated into or combined with a hood or housing enclosure having is own blowers and defining its own plenum rather than using a common plenum as in the FIG. 2 embodiment. With reference to FIG. 12 of the accompanying drawings, housing enclosure 110 has sidewalls 112, top wall 114 and a pair of blowers 118. A resilient strip 132 surrounds the housing enclosure 110, for partially sealing the unit to adjacent units and lessening vibration of units. The filter frame and filter packs (not shown) may be unitary structures fixed within the housing enclosure 110 or comprise one or more of the filter packs and filter frames such as shown in FIGS. 2, 3 and 13. The suspension arrangement is also the same, except that the housing enclosure top wall 114 defines mounting holes 115, 117 rather than the divider of a filter frame.

The location and style of the fastener can be varied to meet different needs. For example, the fastener can be of different configurations from that shown in FIGS. 4 and 7, be placed in different locations, including outside the front face of the filter unit, or within the perimeter of the filter. In FIG. 5, for example, the rod 68 extends nearly the full height of the filter unit frame 50 and is secured adjacent hole 86 by fastener nut 111 and washer 113 acting against the front wall 84 of the divider 57 which is suitably inwardly deflected at 109 to accommodate the fastener nut. Plug 100 then is used to close up the opening formed by the deflection 109.

In FIG. 6, for another example, suspension rod 168 depends from a support surface (not shown) and has its threaded portion 174 extending through a hole 140 in the top wall 142 of the side 144 of the frame 150 beyond the filter unit rear face 48. The rod 168 is secured by threaded connection to a fixed nut 146 just beyond the filter media 56.

Figure 15:
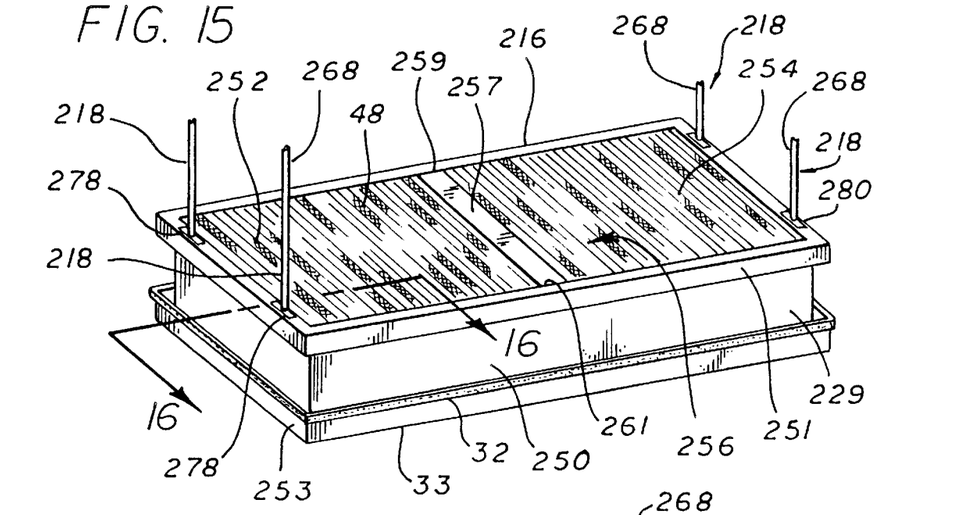
FIG. 15 is a view of filter units suspended with an alternate suspension assembly.
Figure 16:
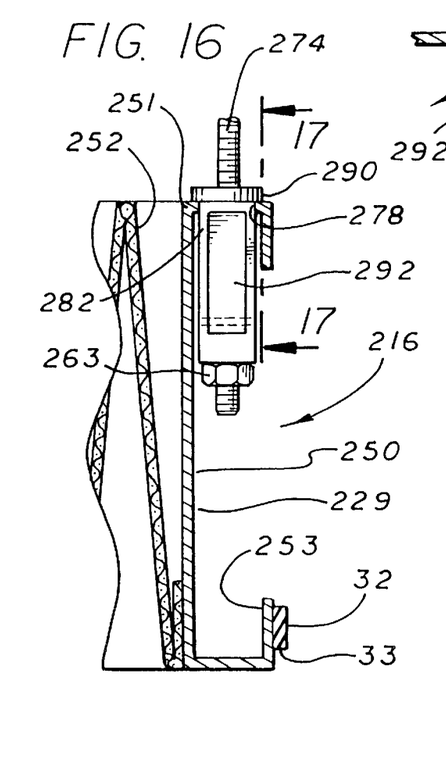
FIG. 16 is a view in section of the filter unit suspension assembly taken on line 16—16 in FIG. 15.
Figure 17:
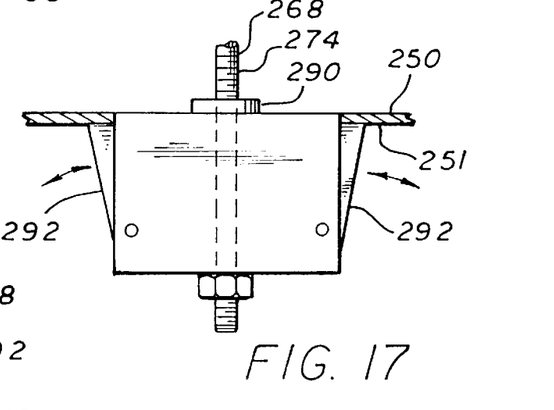
FIG. 17 is a view taken on line 17—17 in FIG. 16.

In FIGS. 15, 16 and 17, individual filter unit 216 of a series array is supported from a support surface (not shown) by four suspensions 218 each comprising a rod 268 having a threaded portion 274. Filter unit 216 comprises a frame 250 and has filter packs 252 and 254 disposed therein. Divider 257 fixed to frame 250 at divider ends 259, 261 separates the media filter packs 252, 254. In this embodiment, the frame 250 has a perimetrical upper flange 251 and a perimetrical lower flange 253 surrounding the frame wall 229. Upper flange 251 is pierced with holes 287, 280 adjacent the corners of the frame 250. Rod 268 passes through holes 278, 280, and, in the embodiment shown, passes through a fastener 282 held in place by nut 263 by which the rod is secured to the filter frame 250. Fastener 282 has front and rear fingers 292 spring loaded as in previous embodiments of the fastener to shift outward when not blocked by the holes 278, 280 so as to support the filter unit 216 in position against the plate 290. Strip 32 of resilient material 33 is also provided in this embodiment, secured to the outer face of lower flange 253. This strip 32 will abut an adjacent strip 32 on the next filter unit 216 in the array.

Figure 18:
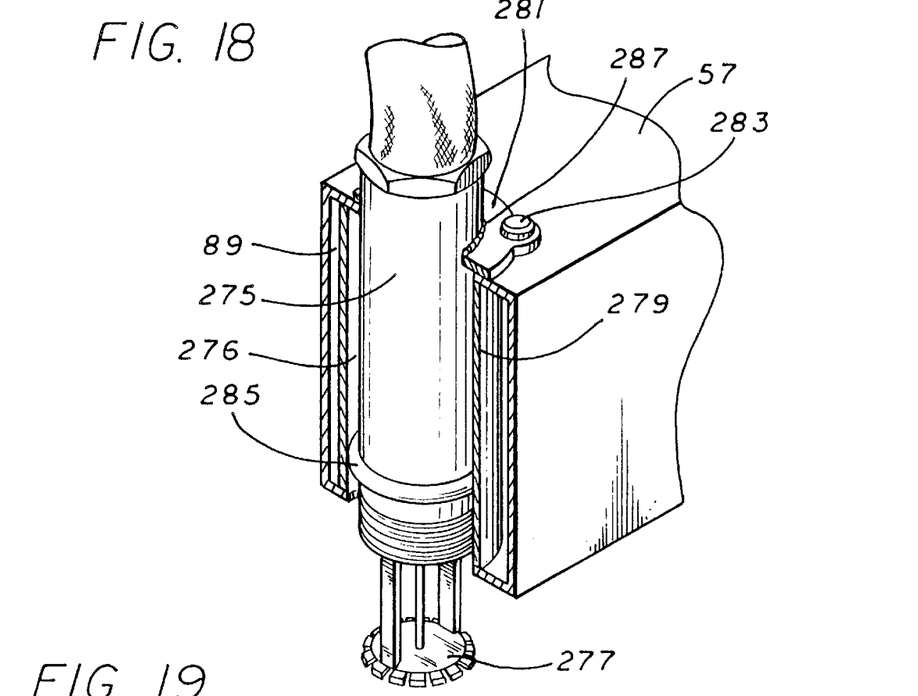
FIG. 18 is a fragmentary, detail view of a filter unit having a water conduit and a sprinkler assembly incorporated therein.
Figure 19:
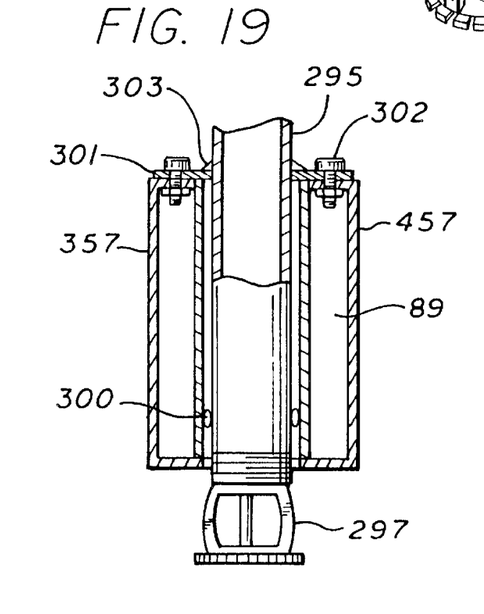
FIG. 19 is a fragmentary view in section of an alternate filter unit and sprinkler arrangement; and, FIG. 20 is a fragmentary view in section of a further alternate filter unit and sprinkler arrangement.
Figure 20:
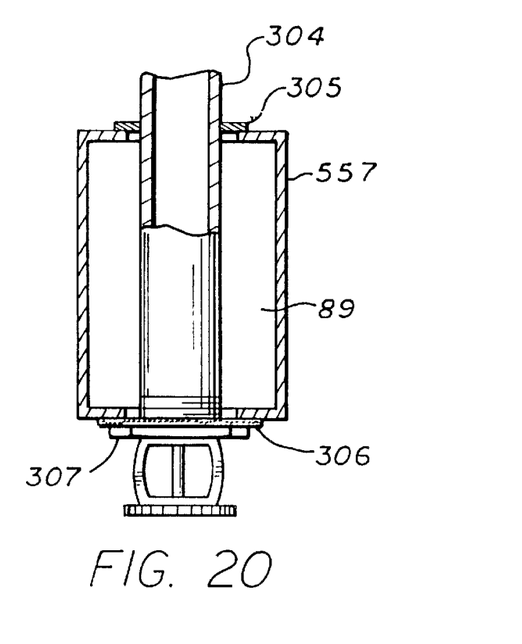

Clean room filter arrays are typically provided with lighting systems and fire prevention systems such as sprinklers. In the present invention, one or more of the filter units may be replaced with a dummy unit, or a lighting unit designed to be compatible with the other filter units in the array, being similarly suspended for example. In FIGS. 18–20 typical sprinkler variations are shown for the present invention. In general, and with reference first to FIG. 18, the sprinkler supply pipe or downcomer 275 is inserted vertically through the divider 57, suitably through a space 276 located between or beside the suspension holes (not shown) and a sprinkler head 277 secured thereto. The downcomer 275 is conveniently passed through a guide conduit 279 fixed in the divider 57 by clamping ring 281 secured by nuts 283 its position being supported by guide ring 285. Caulking 287 about the downcomer 275 provides sealing against air leakage.

In another embodiment shown in FIG. 19, a simple pipe downcomer 295 which supports head 297 is inserted between left and right divider sections 357, 457, guided by ring 300, supported in place by ring 301, nuts and bolts 302 and sealed there by welding or caulking 303. In FIG. 20 the pipe downcomer 304 passes through a single chamber divider 557, sealed at the top by sealing disk 305 and at the bottom by sealing disc 306 and fastener 307.

There is accordingly provided in accordance with the invention clean room ceilings of a less costly, more convenient, simpler, and more effective design. Sealant gels are no longer necessary. Individual filter units are self-supporting, freely of shared support with other filters. Eliminated is the entire grid structure of the prior art formerly thought necessary both to support and to seal the clean room ceiling filter units against sideflows of unfiltered air. All the filters of the invention are in a plane and none need be vertically staggered. No filter shares its support with any filter, much less with three adjacent filters. The invention filter units themselves carry internally or externally but automatically their means of own individual support, not only eliminating the extensive grids used heretofore, but also obviating the need for arbitrary spacing between adjacent filter units left to accommodate the filter support grid in previously known clean room ceilings. The filter units, being individually self-supporting, are added into or removed from a ceiling array without disturbing the laterally or longitudinally adjacent filter units. The filter units are readily shiftable into or out of position. Adjacent filter units are closer together than in conventional clean room ceilings, increasing the proportion of the ceiling that is composed of filter units, reducing air flow incursions between the filter units, its turbulence and concomitant vibration. The invention filter units and filter unit suspension assemblies cooperate to permit ready locking in place by simply shifting the filter unit into position against the installed suspension assembly and snap locking the filter to the support, from below, and without extensive screwing of threaded elements together. Conversely, the filter unit suspension assembly is simply disconnected, and from below the filter unit, for easy removal with a disassembly feature to be described. The filter units are sealed to each other across their narrow separation. Sideflows of air along the filter units walls are blocked by an adherent, suitably self-supporting mass or web bridging the gap between adjacent filters and lying across any possible flow path, an expedient made feasible by the close spacing of the filter units. The new filter support system is easily integrated with sprinkler systems and ceiling lamps. Blank units (rectangular panels without filters) can be substituted for filter units as need without changing the simplicity which is the hallmark of the invention.

What is claimed is:

1. In combination: an individual filter unit having a front face and a rear face and comprising a single frame and filter media within said frame, said filter unit being adapted for arrangement in an array for delivery of filtered air to a clean room, and an individual filter unit suspension assembly unshared with any other filter unit of the array, said individual filter unit suspension assembly comprising a bracket attached to said filter unit frame at said rear face and an elongated member supported from a support surface and adapted to engage said bracket and to support said filter unit in spaced relation of said filter unit frame to said supporting surface, said suspension assembly elongated member extending a predetermined distance to between said filter unit frame front face and rear face, whereby said elongated member terminates beyond said frame rear face, said suspension assembly bracket being mounted to said filter unit frame in a manner to intersect with said elongated member.

2. The combination according to claim 1, in which said filter unit further comprises a filter media divider between and contiguous with separate sections of filter media, said suspension assembly bracket being located at said divider.

3. In combination: an individual filter unit having a front face and a rear face and comprising a single frame, filter media within said frame and a filter media divider between separate sections of filter media, said filter unit being adapted for arrangement in an array for delivery of filtered air to a clean room, and an individual filter unit suspension assembly unshared with any other filter unit of the array, said individual filter unit suspension assembly comprising a bracket located at said divider and attached to said filter unit frame, said divider extending between said filter frame rear face and said filter frame front face, said divider having a shoulder portion defining said suspension assembly bracket, and an elongated member supported from a support surface and adapted to support said filter unit in spaced relation of said filter unit frame to said supporting surface, said suspension assembly elongated member extending a predetermined distance to between said filter unit frame front face and rear face, whereby said elongated member terminates beyond said frame rear face, said suspension assembly bracket being mounted to said filter unit frame in a manner to intersect with said elongated member.

4. The combination according to claim 3, in which said divider shoulder portion-defined suspension assembly bracket defines a member mount, said suspension assembly elongated member being mounted to said suspension assembly bracket at said member mount in individual filter unit supporting relation.

5. The combination according to claim 4, including also a fastener fastenable to said elongated member, said fastener blocking separation of said elongated member and said suspension assembly bracket in individual filter unit supporting relation.

6. The combination according to claim 5, in which said divider is interiorly open between the frame front face and the location of said fastener on said elongated member, said fastener being sized to be movable through the open interior of said divider.

7. The combination according to claim 3, in which said divider has a front face wall, and a rear face wall and a sidewall therebetween defining a divider open interior, said divider open interior extending between its said front and rear face walls, said elongated member extending into said open space through said divider rear face wall, a fastener fastenable to said elongated member in blocking relation to said member inward of said divider rear face wall, said fastener being removable from said member and said divider through said divider front face wall.

8. In combination: an individual filter unit adapted for arrangement in an array for delivery of filtered air to a clean room, and an individual filter unit suspension assembly unshared with any other filter unit of the array, each said filter unit having a filter frame comprising a wall, said filter frame wall having on the outside of said filter frame wall a suspension assembly bracket, said suspension assembly further comprising an elongated member supported from a support surface to said bracket in engaging relation, and a fastener engaged with said bracket in elongated member retaining relation, whereby said filter unit frame is supported.

9. The combination according to claim 8, in which said fastener is supported by said filter unit frame wall engaged with said bracket in elongated member retaining relation, whereby said filter unit frame is supported.

10. The combination according to claim 9, in which said suspension assembly bracket comprises a flange projecting from said filter frame wall in elongated member engaging relation in cooperation with said fastener.

11. The combination according to claim 10, including also a sealing strip circumscribing said filter frame in adjacent filter frame engaging relation, said bracket flange overlying said sealing strip.

12. In combination: an individual filter unit having a front face and a rear face and comprising a single frame and filter media within said frame, said filter unit being adapted for arrangement in an array for delivery of filtered air to a clean room, and an individual filter unit suspension assembly unshared with any other filter unit of the array, said individual filter unit suspension assembly comprising a bracket attached to the outside of said filter unit frame and an elongated member supported from a support surface and adapted to support said filter by said bracket in spaced relation of said filter unit frame to said supporting surface.

13. The combination according to claim 12, in which said filter unit frame bracket comprises a flange formed on said frame.

14. The combination according to claim 12, including also a fastener fastenable to said elongated member, said fastener blocking separation of said elongated member and said suspension assembly bracket in individual filter unit supporting relation.

15. In combination: an individual filter unit adapted for arrangement in an array for delivery of filtered air to a clean room, and an individual filter unit suspension assembly unshared with any other filter unit of the array, each said filter unit having a filter frame comprising a wall, said filter frame wall defining on the outside of said filter frame wall a suspension assembly bracket, said suspension assembly further comprising an elongated member supported from a support surface to said bracket in engaging relation.

16. The combination according to claim 15, in which said suspension assembly bracket further comprises a fastener supported by said filter unit frame wall, said fastener being engaged with said bracket in elongated member retaining relation, whereby said filter unit frame is supported.

17. The combination according to claim 16, in which said suspension assembly bracket comprises a flange projecting outward from said filter frame wall in elongated member engaging relation in cooperation with said fastener.

18. The combination according to claim 17, including also a sealing strip circumscribing said filter frame engaging relation.

19. A filter unit for installation in a clean room array of filter units said filter unit comprising a single filter frame, filter media within said frame, and a frame flange forming suspension assembly bracket defining a locus of attachment for an elongated member extending from a supporting surface, said filter unit frame including a frame wall surrounding said filter media, said frame wall defining an external bracket cooperating with said elongated member in filter unit supporting relation.

20. The filter unit according to claim 19, in combination with a fastener engaged with said bracket.

* * * * *